Aug. 22, 1939.  C. C. FARMER  2,170,239
FLUID PRESSURE BRAKE
Filed May 17, 1938
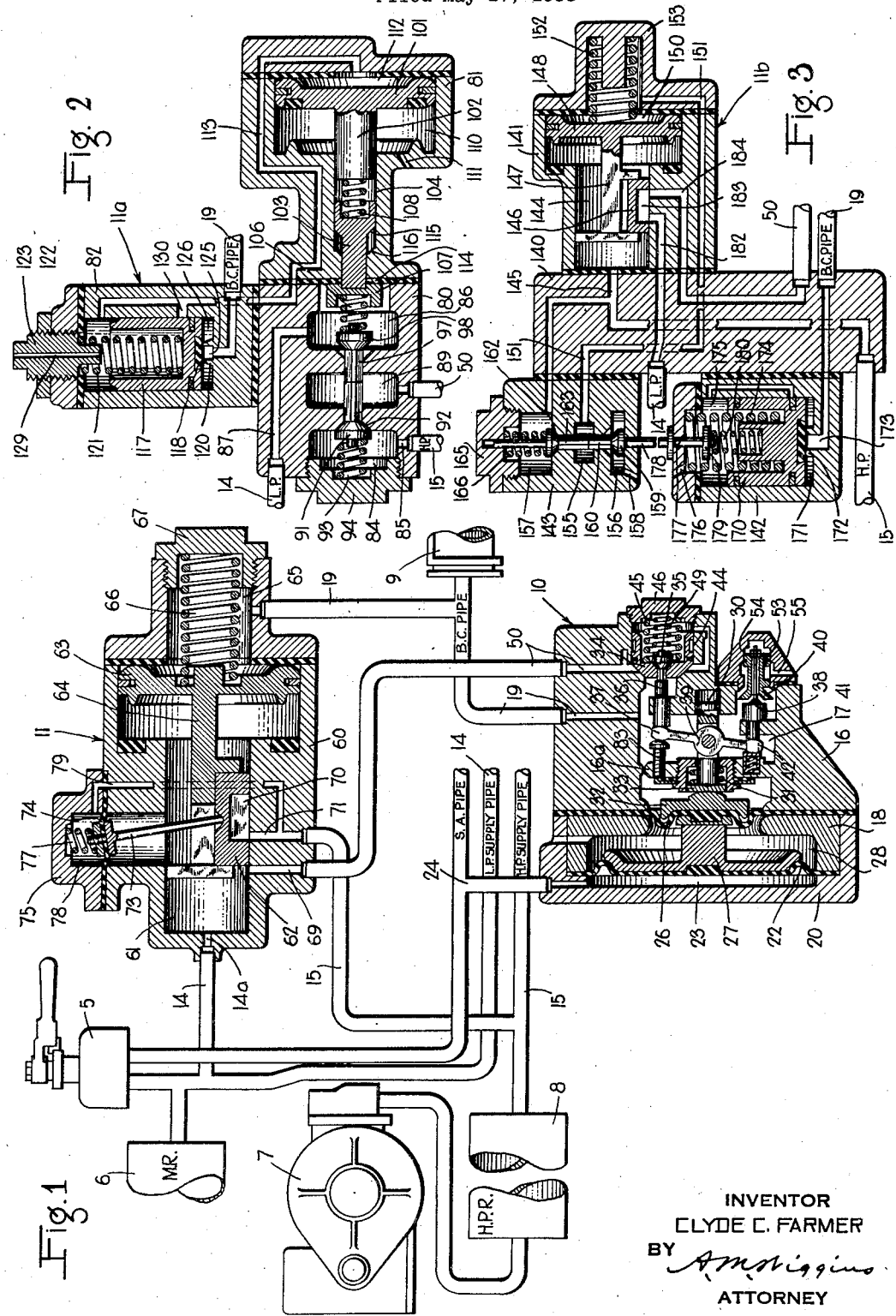
INVENTOR
CLYDE C. FARMER
BY
ATTORNEY

UNITED STATES PATENT OFFICE 2,170,239

FLUID PRESSURE BRAKE

Clyde C. Farmer, Pittsburgh, Pa., assignor to The Westinghouse Air Brake Company, Wilmerding, Pa., a corporation of Pennsylvania Application May 17, 1938, Serial No. 208,402

18 Claims. (Cl. 303—57)

This invention relates to fluid pressure brakes, and more particularly to a brake apparatus operative to effect the building up of a high fluid pressure in the brake cylinder for causing the desired degree of application of the brakes.

In certain classes of transportation service, vehicles of considerable weight are operated at high speeds, and accordingly must be equipped with air brake apparatus adapted to effect application of the brakes with sufficient force or power to insure safe control of the vehicles or train of cars. Because of limitations in the space available on trucks and bodies on some modern cars, however, it may be difficult to mount thereon brake cylinders large enough and brake rigging of suitable amplifying power to produce the desired braking force when operated by fluid under a standard or moderately high pressure. In such a case the desired high braking ratio may, nevertheless, be provided by employing brake equipment including brake cylinders of suitable standard size but adapted to be supplied with fluid at a maximum pressure greater than the fluid pressure which would be required for larger and more bulky brake cylinders having pistons of extremely large area.

One object of my invention is to provide an improved fluid pressure brake equipment adapted for economical and efficient service under the above conditions and including means operable to supply fluid at the desired high pressure to the brake cylinder without requiring the relatively difficult and expensive maintenance of unduly large supply volumes of fluid under maximum pressure.

In order to effect economical operation of such a fluid pressure brake equipment with a minimum volume of fluid maintained at extremely high pressure, it is desirable to provide brake controlling means adapted to respond to variations in pressure in the system charged with fluid under moderate or usual pressure, which might be seventy pounds per square inch, and operable thereby to effect ultimately the supply to the brake cylinders of fluid at a higher pressure, perhaps two hundred pounds per square inch, from a separately charged source.

It is another object of my invention to provide a fluid pressure brake equipment operable according to variations in the pressure of fluid maintained in a control system at moderate pressure to effect an initial supply of fluid from a primary source to the brake cylinder until the pressures are substantially equalized, and then operative simultaneously to cut off communication between that source and the brake cylinder and to effect final supply of fluid under maximum pressure from a separate source to the brake cylinder, thereby building up brake cylinder pressure to the desired degree with the relatively small volume of fluid at maximum pressure required after the brake cylinder pressure has been equalized with that of the primary source.

A further object of the invention is to provide a fluid pressure brake equipment comprising means for maintaining a primary supply of fluid under moderate pressure and a supplementary supply of fluid under higher pressure, together with relay and control valve means automatically operative by fluid pressure to effect supply of fluid under pressure to the brake cylinder first from the primary source and then from the supplementary source.

Other objects and advantages of the invention will appear in the following detailed description thereof, taken with reference to the accompanying drawing, wherein Fig. 1 is a diagrammatic view, partly in section, of a fluid pressure brake equipment embodying my invention; and Figs 2 and 3 are diagrammatic sectional views of different forms of control valve devices which may be substituted for the control valve device illustrated in Fig. 1.

*Description of embodiment shown in Fig. 1*

The fluid pressure brake equipment illustrated in elementary form in Fig. 1 has the characteristics of a straight air brake system, but it should be understood that my invention is also adapted to be embodied in a brake system of the well known automatic type in which a normally charged brake pipe is employed.

The simplified straight air brake equipment illustrated in Fig. 1 comprises a self-lapping brake valve device 5, a main reservoir 6, an auxiliary compressor 7, a supplementary high pressure reservoir 8, a brake cylinder 9, a differential relay valve device 10 and a control or selector valve device 11. The equipment shown is adapted to be carried on a locomotive, but may of course be associated with other brake equipments including the brake cylinder and relay and control valves 10 and 11 carried on the cars coupled to the locomotive. The main reservoir 6 on the locomotive is adapted to be supplied in the usual manner, by a suitable compressor, not shown, with fluid under a moderate or relatively low pressure, which may be seventy pounds per square inch, and is connected to a low pressure supply pipe 14 extending throughout the train. The auxiliary compressor 7 is operative to supply fluid to the high pressure reservoir 8 at a pressure considerably in excess of the normal pressure of fluid maintained in the main reservoir 6. Fluid may thus be maintained in the supplementary high pressure reservoir 8 at about two hundred pounds per square inch, and is supplied therefrom to the high pressure supply pipe 15, which like the low pressure supply pipe 14 extends throughout the train.

According to my invention, the differential relay valve device 10 comprises a casing section 16 having a chamber 17, a cover plate 20 mounted on the casing section 16, and an interposed casing section 18, the three casing members being secured together by any suitable means such as bolts, not shown. The chamber 17 communicates by way of a passage and pipe 19 with the brake cylinder 9. Interposed between the casing section 18 and cover plate 20 is a flexible diaphragm 22, which together with the cover plate 20 defines a chamber 23 communicating with an operating or straight air pipe 24 that extends throughout the train. Interposed between the casing sections 18 and 16 is a flexible diaphragm 26, the pressure area of which is considerably less than that of the diaphragm 22. The diaphragm 26 is subject to the pressure of fluid in the chamber 17 and is operatively connected to the larger diaphragm 22 by means of a follower element 27, which is disposed in a chamber 28 formed intermediate the two diaphragms and communicating with the atmosphere.

The associated diaphragms 22 and 26 are designed to operate a supply and release valve actuating mechanism, which is mounted in the casing 16 and is similar to that employed in the relay valve device disclosed in the United States Patent 2,096,491 issued on October 19, 1937, to E. E. Hewitt. This mechanism includes a plunger 30, which is slidably mounted in a suitable bore formed in a portion 16a of the casing section 16 and is urged into operative engagement with a follower 32, carried on the diaphragm 36, by a spring 31 interposed between portion 16a and a shoulder 33 of the plunger 30, and a lever 39 which is pivotally mounted intermediate the ends thereof on the plunger 30. The lever 39 is arranged to operate a supply valve 34 and pilot valve 35 having a stem 36 operatively aligned with one end 37 of the lever, and a release valve 40 and its pilot valve 38 operatively connected by means of a stem 41 to the other end 42 of the lever.

The supply valve 34, which is mounted in a bore 44 formed in the casing section 16, is urged toward seated position by a spring 45 which is interposed between the valve and a cap nut 46, and the pilot valve 35 is urged toward seated engagement with a suitable seat formed on the supply valve 34 by a similarly mounted spring 49. The supply valve 34 and its pilot valve 35 are cooperative to control communication from a supply pipe and passage 50 to the chamber 17, as will be hereinafter explained.

The release valve 40 has a piston portion 53 slidably mounted in a bore 54 formed in the casing, and is adapted to control communication between the chamber 17 and an atmospheric exhaust port 55. The pilot valve 38 associated with the discharge valve 40 is adapted to establish equalization of the opposing fluid pressures on the valve 40 and piston portion 53 for facilitating unseating operation of the valve through the medium of the stem 41.

According to the invention, the control or selector valve device 11 is operative selectively to control communication from either the low pressure supply pipe 14 or the high pressure supply pipe 15 to the inlet passage 50 of relay valve device 10. As shown in Fig. 1 of the drawing the control valve device 11 comprises a casing 60 having formed therein a valve chamber 61 containing a slide valve 62, which is adapted to be operated by a piston 63 through the medium of a stem 64. The piston 63 is subject on one side to the pressure of fluid in the valve chamber 61 and on the opposite side to the combined pressures of fluid in a chamber 65, connected through the pipe 19 with the brake cylinder 9, and of a spring 66, which is interposed between the piston and a cap nut 67 secured to the casing.

The valve chamber 61 is always in communication through a passage 14a with the low pressure supply pipe 14, and, with the slide valve 62 in the normal or low pressure supply position as shown in Fig. 1, the valve chamber also communicates by way of a port 69 in the slide valve seat with the pipe 50, which leads to the relay valve device 10. The slide valve 62 has a cavity 70 formed therein, which cavity is adapted on movement of the slide valve to a high pressure supply position, as hereinafter explained, to establish communication between the port 69 and a port 71 which is connected to the high pressure supply pipe 15.

Means is provided for loading the slide valve 62, which means comprises a substantially vertically disposed rod 73, the lower end of which operatively engages in a suitable recess in the slide valve 62 and the upper end of which is secured to a flexible diaphragm 74 clamped between the casing 60 and a cover plate 75. For urging the diaphragm 74 and rod 73 downwardly, a spring 77 is interposed between the rod and the cover plate 75 within a chamber 78, which communicates by way of a passage 79 with the high pressure supply pipe 15.

*Operation of embodiment shown in Fig. 1*

With the self-lapping brake valve device 5 in release position, the chamber 23 of the relay valve device 10 is connected with the atmosphere by way of the pipe 24 and suitable ports, not shown, in the brake valve device, so that the valve mechanism in the relay valve device is permitted to assume release position. In this position of the relay valve device the spring 31 is adapted to maintain the plunger 30 in its extreme left-hand position as viewed in the drawing, the end 37 of the lever 39 being thereby positioned in engagement with a stationary abutment 83 carried by the portion 16a of the casing, so that the lever 39 is urged in a clockwise direction about its pivotal connection with the plunger for causing the end 42 to hold the pilot valve 38 and exhaust valve 40 in unseated position, through the medium of the stem 41. The supply valve 34 and pilot valve 35 are at the same time maintained in seated position by the springs 45 and 49 respectively. With the relay valve device 10 in release position, the brake cylinder 9 is thus connected with the atmosphere by way of the pipe and passage 19, chamber 17, and past the unseated exhaust valve 40.

The main reservoir 6 is charged in the usual manner with fluid under a moderate or relatively low pressure, and a portion of the fluid under pressure from the main reservoir is, as already explained, supplied under the desired high pressure to the high pressure reservoir 8, by operation of the auxiliary compressor 7. Fluid under pressure is also supplied from the main reservoir 6 by way of the low pressure supply pipe 14 to the valve chamber 61 of the control valve device 11, and since the chamber 65 on the opposite side of the piston 63 is at this time connected to the atmosphere together with the brake cylinder 9, the fluid pressure acting in the valve chamber 61 forces the piston into the position shown in Fig. 1 of the drawing, against the force of the spring 66, the slide valve 62 being thereby positioned to close the port 71 while maintaining communication from the chamber 61 through the port 69 and pipe 50.

If it is desired to effect an application of the brakes, the engineer's brak valve device 5 is moved to a position within the application zone, and the self-lapping valve mechanism therein is thereby operated in the well known manner to effect supply of fluid under pressure from the main reservoir 6 through the straight air pipe 24 to the diaphragm chamber 23 of the differential relay valve device 10. The pressure of fluid thus supplied to the chamber 23 acts against the diaphragm 22 to shift the follower member 27, diaphragm 26, follower member 22 and plunger 30 toward the right as viewed in the drawing, against the pressure of the spring 31. The end 37 of the lever 39 is at this time fulcrumed on the end of the pilot valve stem 36, which is held against movement by the pressure of the spring 49, so that initial movement of the plunger 30 causes the lever 33 to be tilted in a counterclockwise direction, the end 42 thereof being thus operated to move first the pilot valve 38 and then the release valve 40 to their seated positions for cutting off communication between the chamber 17 and the atmosphere.

The end 42 of the lever 43 is then fulcrumed on the stem 41, and continued movement of the plunger 30 under the force of fluid acting against the diaphragm 22 thereupon effects tilting of the lever in a clockwise direction, the end 37 thereof moving the stem 36 to unseat the pilot valve 35. With the pilot valve unseated, the fluid pressure on opposite sides of the supply valve 34 are substantially equalized, so that the supply valve is then readily unseated by further operation of the stem 36 against the force of the spring 45.

With the supply valve 34 thus unseated, fluid under pressure is supplied from the low pressure supply pipe 14 through the valve chamber 61 of the control valve device 11, the port 69, pipe and passage 50, past the unseated valve 34, and through the chamber 17 of the relay valve device, and passage and pipe 19, to the brake cylinder 9, for effecting an application of the brakes.

At the same time, fluid under pressure is supplied by way of the brake cylinder pipe 19 to the chamber 65 of the control valve device 11. Assuming that the handle of the brake valve device 5 has been moved far enough to effect a fairly heavy application of the brakes, so that the force exerted by fluid under pressure in chamber 23 of the relay valve device acting on the large diaphragm 22 remains greater than the force exerted against the small diaphragm 26 by fluid supplied from the low pressure supply pipe 14 as just described, the relay valve device 10 is maintained in application position for continuing supply of fluid under pressure from the low pressure supply pipe to the brake cylinder 9 and chamber 65 of the control valve device 11. As the pressure of fluid thus supplied to the chamber 65 approaches equalization with the fluid pressure acting in the valve chamber 61 against the piston 63, the spring 66 becomes eective to shift the piston 63 and thereby the slide valve 62 to the left as viewed in the drawing, until the cavity 70 of the slide valve registers with the port 69. With the slide valve 62 so positioned, communication between the valve chamber 61 and the port 69 is thus cut off while communication is established through which fluid under high pressure is supplied from the high pressure reservoir 8 and supply pipe 15 by way of the port 71, cavity 70, port 69, pipe and passage 50, past the still unseated supply valve 34 in the relay valve device 10, and thence through the chamber 17 and passage and pipe 19 to the brake cylinder 9, which is thereby operated to effect application of the brakes with the desired high braking force.

Fluid under high pressure is thus supplied from the high pressure reservoir 8 to the brake cylinder 9 until the fluid pressure in the chamber 17 of the relay valve device 10 and acting against the small diaphragm 26 is increased sufficiently to equal the opposing pressure of fluid in the chamber 23 acting on the large diaphragm 22. When the fluid pressure in the chamber 17 reaches such a value, the diaphragms 26 and 22 are moved to the left, under the force of the spring 31 acting on the plunger 30 and of the springs 45 and 49 acting on the supply valve 34, the force of the latter springs being transmitted through the medium of the stem 36 and lever 39 to the plunger 30. The lever 39 is then tilted in a counterclockwise direction about its pivotal connection with the plunger for permitting engagement of the valve 34 with its seat while maintaining the exhaust valve 40 seated. With further supply of fluid under pressure to the chamber 17 and the connected brake cylinder 9 thus cut off, the parts of the relay valve device 10 are consequently held in lap position.

In order to effect the release of the brakes following a high pressure application as just described, the engineer moves the handle of the brake valve device 5 to release position, whereby the straight air pipe 24 is again connected to the atmosphere for releasing fluid under pressure from the chamber 23 of the relay valve device 10. Upon reduction in the pressure of fluid in chamber 23, the fluid pressure in the chamber 17 becomes effective to move the diaphragm 26, follower member 27 and diaphragm 22 to release position as shown in Fig. 1. At the same time, the spring 31 operates the plunger 30 and lever 39 of the valve mechanism to effect unseating of the pilot valve 38 and exhaust valve 40, so that fluid under pressure is quickly vented from the brake cylinder 9 and chamber 65 of the control valve device 11 by way of the pipe and passage 19, the chamber 17 of the relay valve device, and past the unseated valve and through the exhaust passage 55, thereby effecting the release of the brakes.

As the pressure of fluid in the chamber 65 of the control valve device 11 is thus reduced, the spring 66 is caused to yield under the force of fluid in the valve chamber 61 acting against the piston 63, and the piston is thereby operated to move the slide valve 62 toward the right into the position shown in Fig. 1, this movement of the slide valve cutting off communication between the port 71 and port 69, while establishing communication from the chamber 61 to the port 69.

It will be apparent that, since the equipment just described is thus operative first to supply fluid from a low pressure source to the brake cylinder until the fluid pressure therein is substantially equalized with that in the low pressure source, and then to cut off the low pressure source and to effect further supply of fluid from a high pressure source for building up maximum brake cylinder pressure, the quantity of fluid which must be maintained under high pressure in the high pressure source is considerably less than would be the case if the brake cylinder were to be supplied only from the high pressure source. It will also be evident that, for a required maximum brake cylinder pressure, the pressure of fluid with which the high pressure source is charged may be lower, and consequently more economically maintained, than would be necessary if the fluid pressure in the high pressure source were equalized with both the brake cylinder pressure and that of the low pressure source.

*Description of embodiment shown in Fig. 2*

Another form of control valve device constructed according to the invention is illustrated in Fig. 2 of the drawing, this control valve device, which is indicated generally by the character 11a, being adapted to perform functions similar to those already explained in connection with the control valve device 11 shown in Fig. 1. It will thus be understood that the control valve device 11a may be substituted for the control valve device 11 in association with the equipment shown in Fig. 1.

Referring to Fig. 2 of the drawing, the control valve device 11a comprises casing sections 80, 81 and 82, the latter two casing sections being secured to the casing section 80 by any suitable means, such as bolts, not shown. The casing section 80 has formed therein a valve chamber 84 communicating through a passage 85 with the high pressure supply pipe 15, a valve chamber 86 communicating through a passage 87 with the low pressure supply pipe 14, and a chamber 89 which is disposed intermediate the valve chambers and communicates with the pipe 50. Disposed in the valve chamber 84 is a valve 91, which is adapted to control communication between the chamber 84 and the chamber 89 and is normally urged into engagement with a seat 92 by the force of a spring 93, which is interposed between the valve and a cap nut 94 having screw-threaded engagement with the casing section 80 for closing the chamber 84. A fluted stem 96 of the valve 91 extends into the chamber 89 and is adapted to engage a similar fluted stem 97 of a valve 98, which is disposed in the valve chamber 86. The valve 98 is engageable with a seat 99 and is adapted to control communication between the chambers 86 and 89, it being noted that the valve 98 is held in unseated position while the valve 91 is in seated position as shown in Fig. 2.

For operating the associated valves 91 and 98, there is provided a piston 101, which is slidably mounted in a suitable bore formed in the casing section 81 and has a stem 102 disposed in operative alignment with a plunger 103 which is in turn operatively aligned with the valve 98. The plunger 102 and plunger 103 are slidably mounted in a bore 104 formed in the casing section 81. A yielding or lost motion connection is provided between the piston 101 and the valve 98 by means of a coil spring 106, which is interposed between the valve 98 and a follower 107 carried on the end of the plunger 103, and a similar coil spring 108 which is interposed between the plunger 103 and the stem 102 of the piston. The piston 101 has formed at one side thereof a chamber 110 communicating by way of a passage 111 with the atmosphere, and is subject on the opposite side to the pressure of fluid in a chamber 112 communicating with a passage 113 formed in the casing.

The piston 101 is normally urged toward the right hand into the position shown in the drawing by the force of the spring 93 transmitted through the valves 91 and 98, spring 106, plunger 103, spring 108 and the stem 102. It will be noted that the member 107 is adapted to seal against a gasket 114 when the associated elements of the control valve device 11a are in the position shown in Fig. 2, so that leakage from the chamber 86 by way of the bore 104 and chamber 110 is prevented. For the same purpose the plunger 103 is provided with an inclined shoulder 115 which is adapted to engage a seat 116 formed within the casing section 81 upon movement of the plunger 103 to the left by the piston 101, as hereinafter explained.

Slidably mounted in a suitable bore formed in the casing section 82 is a piston valve 117, having a face 118 normally urged into engagement with an annular seat rib 120, formed on the casing at one end of the bore, by the force of the spring 121, which is disposed in a chamber 122 between the valve 117 and a member 123 adjustably secured to the casing. The annular seat rib 120 defines a central chamber 125 which is connected with the brake cylinder pipe 19, and also defines a chamber 126 surrounding said seat rib, so that fluid under pressure supplied through the pipe 19 acts initially on the inner seated area of the piston valve 117 exposed to the chamber 125 until the piston valve is unseated, whereupon the entire area of the valve will be exposed to the fluid pressure. The piston valve 117 is thus adapted to be moved from seated position to unseated position with a so-called snap action.

With the piston valve 117 in seated position as shown in Fig. 2, the passage 113 leading from the piston chamber 112 communicates with the atmosphere through the spring chamber 122 and a passage 129 formed in the member 123. Upon movement of the piston valve 117 to unseated position against the force of the spring 121 as hereinafter explained, communication between the passage 113 and the chamber 122 is cut off, and the valve at the same time uncovers a port 130 for establishing communication between the passage 113 and the chambers 126 and 125.

*Operation of embodiment shown in Fig. 2*

In order to effect an application of the brakes, the engineer operates the brake valve device for effecting operation of the differential relay valve device to initiate the supply of fluid under pressure to the brake cylinder in the manner hereinbefore described in connection with the first embodiment of the invention, it being understood, by reference to both Figs. 1 and 2 of the drawing, that fluid from the low pressure supply pipe 14 is thus supplied through the passage 87 of the control valve device 11a, the chamber 86, past the unseated valve 98, through the chamber 89 and pipe 50 which communicates with the relay valve device, and thence to the brake cylinder which communicates with the pipe 19.

When the pressure of fluid thus supplied from the low pressure supply pipe 14 to the brake cylinder pipe 19 and the chamber 125 is increased sufficiently to cause unseating of the piston valve 117 against the predetermined force of spring 121, the piston valve is quickly moved to its uppermost position, as viewed in Fig. 2, and fluid at brake cylinder pressure is then supplied from the pipe 19 through the chambers 125 and 126, port 130 and passage 113 to the chamber 112. The piston 101 is thereby shifted inwardly or to the left, referring to Fig. 2, and in so moving acts through the medium of the stem 102, spring 108, plunger 103 and spring 106 for moving the associated valves 98 and 91 to seated and unseated positions, respectively. It should be understood that the spring 93 which acts on the valve 91 is adapted to yield during the above movement of the valve until the valve 98 engages the seat 99, whereupon the somewhat stronger spring 106 is compressed sufficiently to permit engagement of the shoulder 115 of the plunger 103 with the seat 116 under the force of the spring 108, which is heavier than either of the springs 93 and 106.

With the valve 98 seated and the valve 91 unseated, communication is established for the supply to the brake cylinder of fluid under high pressure, which flows from the high pressure supply pipe 15 through the valve chamber 84 and past the unseated valve 91, through the chamber 89 and pipe 50 to the relay valve device, and thence as already explained to the brake cylinder for building up the desired brake cylinder pressure.

In effecting the release of the brakes, fluid under pressure is vented from the brake cylinder, and consequently from the pipe 19, in the manner hereinbefore explained. Upon the reduction in the pressure of fluid acting on the piston valve 117, the spring 121 becomes effective to move the valve to seated position, the passage 113 being thereby connected through chamber 122 and passage 129 with the atmosphere. The fluid pressure in the piston chamber 112 is thus reduced, so that the spring 93 is permitted to return the valves 91 and 98 and the movable elements including the piston 101 associated therewith to the normal position shown in Fig. 2 of the drawing.

*Description of embodiment shown in Fig. 3*

In Fig. 3 of the drawing my invention is shown embodied in a control valve device 11b, which comprises a pipe bracket 140 having suitably secured thereto casing sections 141, 142 and 143. Formed in the casing section 141 is a valve chamber 144 communicating by way of a passage 145 with the high pressure supply pipe 15 and containing a slide valve 146, which is operatively connected through the medium of a stem 147 with a piston 148 that is slidably mounted in a suitable bore formed in the casing. The piston 148 is subject on one side to the pressure of fluid in the valve chamber 144, and has at the opposite side a chamber 150, which communicates with a passage 151. A biasing spring 152 is disposed between the piston 148 and a cover plate 153 secured to the casing section 141.

The passage 151 communicates with a chamber 155 formed in the casing section 143 intermediate a valve chamber 156 and a valve chamber 157. The valve chamber 156 communicates by way of an opening 158 with the atmosphere, and has mounted therein a valve 159 which is provided with a fluted stem 160 extending through a suitable bore into the chamber 155.

Disposed in the valve chamber 157 is a valve 162 having a fluted stem 163 which extends through a suitable bore into the chamber 155 and in operative alignment with the stem 160. Interposed between the valve 162 and a cap nut 165 is a coil spring 166 which acts normally to maintain the valve 162 in seated position while holding the valve 159 in unseated position, as shown in the drawing.

Means for actuating the associated valves 159 and 162 is provided in the casing section 142, comprising a valve piston 170 slidably mounted in a suitable bore formed in the casing and having at one side thereof a chamber 171 surrounding an annular seat rib 172, which rib is engageable by the valve piston 170 and together with the piston defines a chamber 173 communicating with the brake cylinder pipe 19. The valve piston 170 is urged into engagement with the seat rib 172 by the force of a spring 174, which is disposed in a chamber 175 that communicates with the atmosphere through a passage 176. In order to transmit movement of the valve piston 170 away from the seat rib there is provided a plunger 77, which is slidably mounted in a suitable bore in the casing and has one end thereof disposed in operative alignment with the end of a projecting stem 178 of the valve 159, the opposite end of the plunger 177 extending into the chamber 175 and having formed thereon a collar 179, which rests on a spring 180 carried by the valve piston 170.

*Operation of embodiment shown in Fig. 3*

With the brake equipment including the control valve device shown in Fig. 3 in release position, it will be understood that the brake cylinder pipe 19 together with the brake cylinder, not shown in Fig. 3, is connected with the atmosphere, so that the valve piston 170, being subject only to atmospheric pressure, is maintained in engagement with the seat rib 172 as shown by the force of the spring 174. With the valve piston 170 in its lowermost position, the plunger 177 is positioned out of operative engagement with the stem 178, and the spring 166 is thus permitted to maintain the valve 162 seated, while the valve 159 is in unseated position. With the valve 159 in unseated position, the chamber 150 at the outer face of the piston 148 is connected with the atmosphere by way of the passage 151, chamber 155, past the fluted stem 160 and unseated valve 159, and through the chamber 156 and passage 158. At the same time, fluid from the high pressure supply pipe 15 is supplied through the passage 145 to the slide valve chamber 144 and acts on the piston 148 in opposition to the force of the spring 152 for maintaining the piston, stem 147 thereof, and slide valve 146 in the normal position shown in Fig. 3, in which position communication is maintained from the low pressure supply pipe 14 through a passage 182, a cavity 183 formed in the slide valve, and a passage 184 with the pipe 50, which of course leads to the seat of the supply valve in the differential relay valve device as shown in Fig. 1 of the drawing.

In operation, an application of the brakes is initiated when the equipment is operated in the manner already explained to effect supply of fluid from the low pressure supply pipe 14 by way of communications in the control valve device 11b and through pipe 50 to the brake cylinder pipe 19, the fluid pressure in the brake cylinder and in the chamber 173 communicating with the brake cylinder pipe being then built up to substantially the pressure of equalization of pressure in the pipe 14 with that in the brake cylinder. Upon this predetermined increase in fluid pressure in the chamber 173, the valve piston 170 is forced upwardly and away from the seat rib 172 against the pressure of the spring 174. As the valve piston is thus unseated, brake cylinder pressure acts on the area thereof exposed to the chamber 171 and quickly shifts the piston to its uppermost position, the spring 180 and the plunger 177 being thereby operated to move the valve 159 into seated position while unseating the valve 162.

With the valve 159 seated, communication to the atmosphere from the chamber 155 is cut off, while communication is established between the chambers 157 and 155 so that fluid at high pressure is supplied from the chamber 144 through passage 145, valve chamber 157, chamber 155, and passage 151 to the chamber 150. The fluid pressures acting on opposite sides of the piston 148 are thus equalized, whereupon the spring 152 becomes effective to shift the piston 148, stem 147 and slide valve 146 to the left as viewed in the drawing, the slide valve being thereby operated to cut off communication between the low pressure supply pipe 14 and the passage 184, while establishing communication to that passage from the valve chamber 144. The supply of fluid under pressure to the brake cylinder is thereafter continued by flow of fluid from the high pressure supply pipe 15 through the passage 145, chamber 144, passage 184 and pipe 50 until the desired brake cylinder pressure is attained.

It will now be apparent that my invention, employed in any of the several illustrative embodiments just described, is operative in effecting an application of the brakes to supply fluid under pressure to the brake cylinder first from a moderate or relatively low pressure source of supply until a predetermined brake cylinder pressure it attained, and then from a high pressure supply source, thereby providing a desired high brake cylinder pressure with maximum efficiency and economy in the use of fluid.

Although three embodiments of my invention have been described in detail, it should be understood that I do not intend to limit the invention to those embodiments or otherwise than by the terms of the appended claims.

Having now described my invention, what I claim as new and desire to secure by Letters Patent is:

1. In a fluid pressure brake apparatus, in combination, a brake cylinder, a relay valve device operable to supply fluid under pressure to said brake cylinder for effecting an application of the brakes, control valve means controlling the communication through which said relay valve device supplies fluid to said brake cylinder, and means normally conditioning said control valve means to permit supply of fluid at moderate pressure through said communication and operative upon a predetermined increase in brake cylinder pressure to condition said control valve means to permit supply through said communication to said brake cylinder of fluid at a higher pressure.

2. In a fluid pressure brake equipment, in combination, a brake cylinder, a source of supply of fluid under low pressure, a source of supply of fluid under high pressure, a relay valve device controlling the supply of fluid from either of said sources to said brake cylinder for effecting an application of the brakes, brake valve means operable to control supply of fluid from said low pressure supply source to said relay valve device in accordance with a desired degree of braking, and a control valve device operative when the pressure of fluid in said brake cylinder is below a predetermined value for permitting supply by said relay valve device of fluid from said low pressure source to the brake cylinder, and operative when the pressure of fluid in the brake cylinder is above said predetermined value to permit supply of fluid by said relay valve device only from the high pressure source to said brake cylinder.

3. In a fluid pressure brake equipment, in combination, a brake cylinder, a primary source of fluid under a certain pressure, a supplementary source of fluid under a higher pressure, brake controlling apparatus including a relay valve device operable to supply fluid under pressure from either of said sources to said brake cylinder for effecting an application of the brakes, and valve means normally positioned to provide communication from said primary source of fluid under pressure to said relay valve device and operative upon a predetermined increase in brake cylinder pressure to establish communication from said supplementary source of fluid under pressure to said relay valve device.

4. In a fluid pressure brake apparatus, in combination, a brake cylinder, a primary source of fluid under a certain pressure, a supplementary source of fluid under a higher pressure, brake controlling apparatus including a relay valve device operable to supply fluid under pressure from either of said sources to said brake cylinder, and a valve device controlling the communication through which said relay valve device is adapted to supply fluid, said valve device being normally adapted to provide communication from said primary source of fluid under pressure to said relay valve device and operative upon a predetermined increase in brake cylinder pressure to cut off the communication from said primary source and to establish communication from said supplementary source to said relay valve device.

5. In a vehicle carried fluid pressure brake, the combination with a brake cylinder and brake controlling valve means of the graduating type for controlling the supply and release of fluid under pressure to and from said brake cylinder, of a plurality of sources of supply of fluid under pressure, and fluid supply selector means operative, in accordance with variations in the pressure of fluid in said brake cylinder, to render said controlling valve means effective in operation to supply fluid under pressure from said supply sources to said brake cylinder in succession.

6. In a vehicle carried fluid pressure brake, the combination with a brake cylinder and a brake controlling valve device of the graduating type for controlling the supply and release of fluid under pressure to and from said brake cylinder, of a source of fluid under low pressure, a source of fluid under high pressure, and fluid supply selector means responsive to the pressure of fluid in said brake cylinder, said supply selector means being operative when brake cylinder pressure is less than a predetermined value to render said controlling valve device effective in operation to supply fluid under pressure to said brake cylinder from said low pressure supply source, and when brake cylinder pressure exceeds said predetermined value to render said controlling valve device effective to supply fluid to the brake cylinder from said high pressure source.

7. In a fluid pressure brake, in combination, an operating pipe, a low pressure supply pipe, a high pressure supply pipe, a brake cylinder, a relay valve device responsive to an increase in fluid pressure in said operating pipe to effect the supply of fluid under pressure from one or the other of said supply pipes to said brake cylinder for causing an application of the brakes, brake control valve means operable to control the pressure of fluid in said operating pipe in accordance with the desired degree of brake application, and supply selector valve means operative in accordance with operation of the relay valve device for causing said device to supply fluid under pressure to said brake cylinder initially from said low pressure supply pipe, and then from said high pressure supply pipe.

8. In a fluid pressure brake, in combination, an operating pipe, a low pressure supply pipe, a high pressure supply pipe, a brake cylinder, a relay valve device responsive to an increase in fluid pressure in said operating pipe to effect the supply of fluid under pressure from one or the other of said supply pipes to said brake clinder for causing an application of the brakes, brake control valve means operable to control the pressure of fluid in said operating pipe in accordance with the desired degree of brake application, selector valve means controlling the communications through which said relay valve device is adapted to supply fluid from each of said supply pipes to said brake cylinder, and means for operating said selector valve means in accordance with brake cylinder pressure.

9. In a fluid pressure brake equipment, in combination, a brake cylinder, a low pressure supply pipe, a high pressure supply pipe, brake controlling valve means operable to control communications from either of said supply pipes to said brake cylinder in effecting an application of the brakes, selector valve means also controlling said communications, and means responsive to brake cylinder pressure for actuating said selector valve means, said selector valve means being normally conditioned thereby to permit supply by said controlling valve means of fluid under pressure from said low pressure pipe to said brake cylinder, and operative upon a predetermined increase in brake cylinder pressure to cut off said communication from the low pressure pipe while establishing communication for continued supply of fluid by said controlling valve means from said high pressure pipe to said brake cylinder.

10. In a fluid pressure brake, in combination, a source of fluid under low pressure, a source of fluid under high pressure, a brake cylinder, a fluid pressure operated relay valve device controlling the supply of fluid under pressure separately from each of said sources to the brake cylinder in effecting an application of the brakes, said relay valve device being actuated by fluid supplied thereto from said low pressure source when an application of the brakes is initiated, and a control valve device responsive to brake cylinder pressure for also controlling the communication through which fluid under pressure is supplied to said brake cylinder, said control valve device being normally conditioned to provide communication from said low pressure source through said relay valve device to the brake cylinder and operative upon a predetermined increase in brake cylinder pressure to establish a different communication from said high pressure source through the relay valve device to said brake cylinder.

11. In a fluid pressure brake, in combination, a source of fluid under low pressure, a source of fluid under high pressure, a brake cylinder, a relay valve device comprising a self-lapping valve mechanism controlling supply of fluid under pressure from either of said sources to the brake cylinder and a pair of associated diaphragms having different areas for actuating said mechanism, the smaller diaphragm being subject to brake cylinder pressure and the larger diaphragm to the opposing pressure of fluid supplied thereto from said low pressure source when an application of the brakes is initiated, and a control valve device controlling the communication through which said relay valve device is adapted to supply fluid under pressure to the brake cylinder, said control valve device being normally conditioned to permit supply of fluid from said low pressure source to the brake cylinder and operative upon a predetermined increase in fluid pressure in said brake cylinder to permit further supply of fluid thereto from said high pressure source.

12. In a fluid pressure brake, in combination, a brake cylinder, a source of fluid under low pressure, a source of fluid under high pressure, brake controlling valve means operable to effect supply of fluid from either of said sources to said brake cylinder for effecting an application of the brakes, and a valve device for selecting the source from which said brake controlling valve means is adapted to effect supply of fluid to the brake cylinder, comprising valve means subject to the pressure of fluid supplied to said brake cylinder and to a substantially constant opposing fluid pressure, said valve means being normally adapted to maintain communication through which fluid under pressure is supplied from said low pressure source to the brake cylinder, and operative upon a predetermined increase in brake cylinder pressure to cut off said communication and to establish another communication through which fluid under pressure may be supplied from said high pressure source to the brake cylinder.

13. In a fluid pressure brake equipment, in combination, a primary source of fluid under low pressure, a supplementary source of fluid under high pressure, a brake cylinder, brake controlling valve means operable to effect supply of fluid from either of said sources to said brake cylinder for effecting an application of the brakes, and a valve device for selecting the source from which said brake controlling valve means is adapted to effect supply of fluid to the brake cylinder, comprising a spring, a movable abutment subject to the opposing pressures of fluid from said primary source and of the spring plus the fluid pressure in said brake cylinder, and a valve operative by said abutment for normally maintaining communication from said low pressure source to said brake controlling valve means and upon a predetermined increase in brake cylinder pressure for establishing communication from said supplementary source of fluid under pressure to said brake controlling valve means.

14. In a fluid pressure brake, in combination, a source of fluid under low pressure, a source of fluid under high pressure, a brake cylinder, and means controlling the supply of fluid from said sources to said brake cylinder in effecting an application of the brakes, said means including a control valve device comprising a slide valve normally positioned to maintain communication through which fluid under pressure may be supplied solely from said low pressure source to said brake cylinder, a movable abutment operative upon a predetermined increase in brake cylinder pressure to move said slide valve to establish communication through which fluid is supplied solely from said high pressure source to said brake cylinder, and means for loading said slide valve under the pressure of fluid from said high pressure source.

15. In a fluid pressure brake, in combination, a source of fluid under low pressure, a source of fluid under high pressure, a brake cylinder, and means controlling the supply of fluid from said sources to said brake cylinder in effecting an application of the brakes, said means including a control valve device comprising valve means normally positioned for maintaining communication through which fluid under pressure may be supplied from the low pressure source to the brake cylinder, a movable abutment operative upon the supply of fluid under pressure to a chamber to move said valve means to another position for establishing communication through which fluid under pressure may be supplied from said high pressure source to the brake cylinder, and fluid pressure actuated valve means responsive to a predetermined increase in brake cylinder pressure for supplying fluid under pressure to said chamber.

16. In a fluid pressure brake, in combination, a source of fluid under low pressure, a source of fluid under high pressure, a brake cylinder, and means controlling the supply of fluid from said sources to said brake cylinder in effecting an application of the brakes, said means including a control valve device comprising valve means normally positioned for maintaining communication through which fluid under pressure may be supplied from said low pressure source to the brake cylinder, a movable abutment operative upon the supply of fluid under pressure to a chamber to move said valve means to another position for establishing communication through which fluid under pressure may be supplied from said high pressure source to the brake cylinder, and a snap-action valve biased toward a normal position for venting said chamber to the atmosphere and operative upon a predetermined increase in pressure of fluid being supplied from said low pressure source to the brake cylinder for supplying a portion of said fluid under pressure to said chamber.

17. In a fluid pressure brake, in combination, a source of fluid under low pressure, a source of fluid under high pressure, a brake cylinder, and brake controlling apparatus operable to effect the supply of fluid under pressure from one or the other of said sources to said brake cylinder in effecting the application of the brakes, including fluid pressure responsive valve means having a normal position for maintaining communication through which fluid under pressure is supplied from said low pressure source to the brake cylinder and movable to another position upon an increase in the pressure of fluid in a chamber for establishing communication through which fluid under pressure may be supplied from said high pressure source to said brake cylinder, and snap-action valve means responsive to a predetermined increase in brake cylinder pressure for supplying fluid under pressure from said high pressure source to said chamber.

18. In a fluid pressure brake, in combination, a source of fluid under low pressure, a source of fluid under high pressure, a brake cylinder, and brake controlling apparatus operable to effect the supply of fluid under pressure from one or the other of said sources to said brake cylinder for effecting an application of the brakes, including fluid pressure responsive valve means having a normal position for maintaining communication through which fluid may be supplied from said low pressure source to said brake cylinder and movable to another position on an increase in the pressure of fluid in a chamber for establishing communication through which fluid may be supplied from said high pressure source to said brake cylinder, valve means normally connecting said chamber to the atmosphere, and a snap-action piston operative upon a predetermined increase in brake cylinder pressure to operate said valve means for supplying fluid under pressure to said chamber.

CLYDE C. FARMER.